United States Patent [19]

Larsson et al.

[11] Patent Number: 4,834,307

[45] Date of Patent: May 30, 1989

[54] OPEN FIXED-SPOOL FISHING REEL

[75] Inventors: Karl-Erik Larsson, Svängsta; Karl L. Carlsson, Asarum, both of Sweden

[73] Assignee: ABU Garcia Produktion AB, Svängsta, Sweden

[21] Appl. No.: 200,848

[22] Filed: Jun. 1, 1988

[51] Int. Cl.⁴ .............................................. A01K 89/01
[52] U.S. Cl. .................... 242/245; 242/228; 242/291
[58] Field of Search ............ 242/84.5 P, 84.5 R, 242/84.5 A, 84.51 A, 84.51 R, 220, 211

[56] References Cited

U.S. PATENT DOCUMENTS

| 2,454,590 | 11/1948 | Berlinger | 242/84.5 R |
| 4,614,314 | 9/1986 | Ban | 242/84.2 R X |
| 4,725,012 | 2/1988 | Councilman | 242/84.5 A |
| 4,746,077 | 5/1988 | Toda | 242/220 X |

Primary Examiner—Stuart S. Levy
Assistant Examiner—Katherine Matecki
Attorney, Agent, or Firm—Browdy & Neimark

[57] ABSTRACT

A fishing reel of the fixed-spool type comprises a frame and a spool shaft rotatably mounted therein. A line spool is non-rotatably mounted on the end of the spool shaft projecting from the frame. The reel has a transmission for changing the movement of a handle, both into a rotary movement of a rotor for winding up a line on the line spool and into a movement of an eccentric device for axial oscillation of the spool shaft. The reel further has an adjustable friction brake intended to allow the line spool to rotate under frictional drag in relation to the frame. Further, the fishing reel has a friction brake release device which is operated by the handle and which, when the handle is turned backwards (in a direction contrary to the direction of retrieve), acts on the preset friction brake so that it can be released and thereafter readily reengaged.

7 Claims, 6 Drawing Sheets

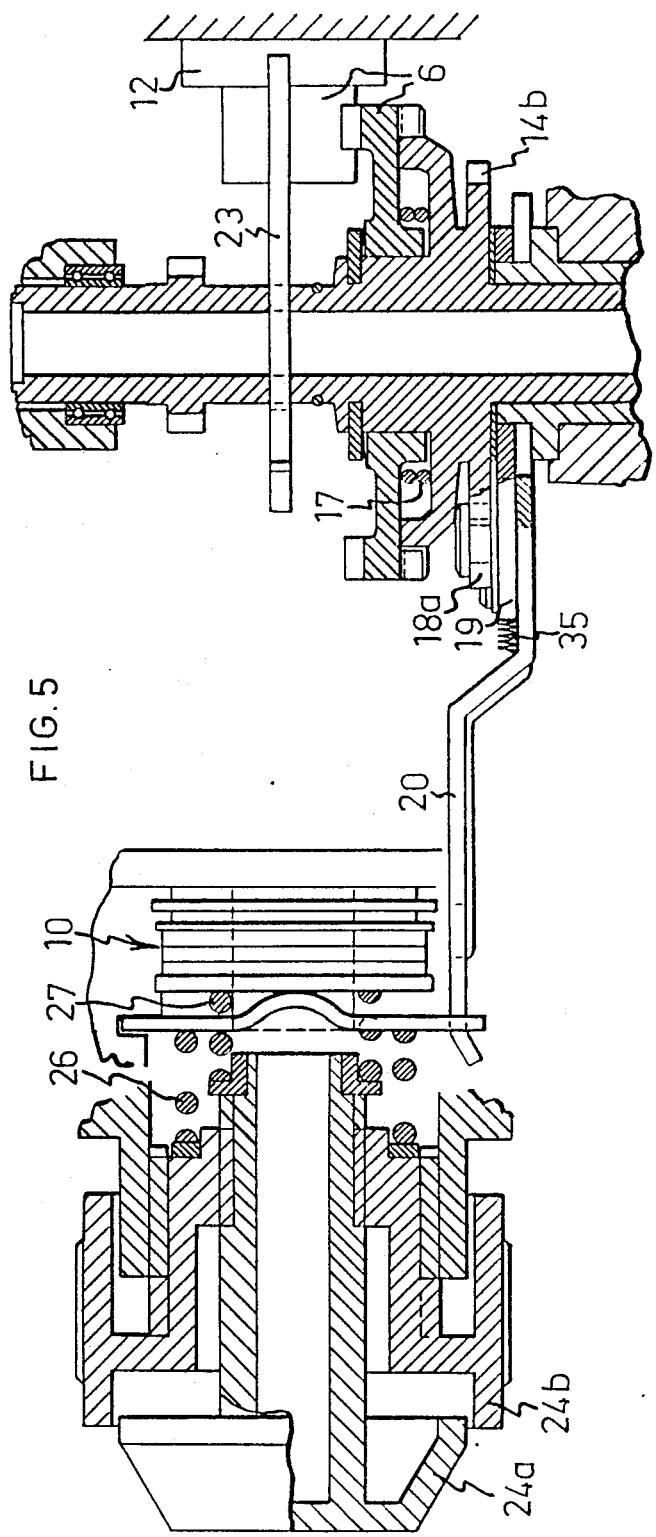

OPEN FIXED-SPOOL FISHING REEL

BACKGROUND OF THE INVENTION

The present invention relates to a fishing reel of the fixed-spool type comprising a frame with a spool shaft rotatably mounted therein and with a line spool non-rotatably mounted on the end of the spool shaft projecting from said frame; transmission means for converting the movement of a handle into a movement of rotation of a rotor for winding up a line on the line spool and into a movement of eccentric means for axial oscillation of the spool shaft; and an adjustable friction brake allowing the line spool to rotate under frictional drag in relation to the frame to avoid excessive load on the line.

In known fishng reels of this type, it is more or less chance that decides to what extent the drag or friction brake is released when a fish bites which is of such a size that there is a risk of line break. Chance also governs when the angler, in order to reduce the braking effect, actuates the means for adjusting the friction brake setting, preset at a value corresponding to a certain size of (force exerted by) a fish the angler expects to catch. In his enthusiasm about having got into a fish, the angler may certainly be aware that it is necessary to release the friction brake or drag, but he is at the same time most likely to forget to memorize the previously set optimum value of the braking effect of the drag. This of course means that there is a risk when the angler should reset the brake, that he sets an incorrect brake force value, which in turn may mean the loss of the next fish to bite. Also, if the angler happens to release the brake to an excessive extent, line tangle may be unavoidable under certain, unfavourable conditions.

SUMMARY OF THE INVENTION

The object of the present invention is to offer a solution to the problems related above.

The fishing reel according to the invention has a friction brake or drag whose braking effect on the spool shaft is adjustable by adjusting means to a desired value. A brake release device is connected between the brake and the adjusting means and is manually actuable to decrease the preset brake force value of the brake to a predetermined second, lower brake force value, said manual actuation being effected against the action of the presetting.

The brake release device is preferably actuated by the crank or handle of the fishing reel. More particularly, the brake release device for decreasing the preset brake force value is actuated by turning the handle backwards (i.e. contrary to the wind-up direction).

Thus, when resuming a previously commenced retrieve, the fishing reel according to the invention will thus always give the same brake force value as preset by the adjusting means. Despite the new additional brake release feature, the reel of the invention is easy to use since brake release and brake reengagement are achieved by means of the existing reel handle.

The friction brake is advantageously divided into two sections, each having separate adjusting means and each being able to apply a frictional braking force to the spool shaft, thus allowing to preset the predetermined second, lower brake force value.

BRIEF DESCRIPTION OF THE DRAWINGS

The invention will be described in more detail hereinbelow in preferred embodiments with reference to the accompanying drawings, in which:

FIGS. 4 and 5 are part-sectional side and top plan views, respectively, showing parts (primarily components F' in FIG. 1B) of the FIG. 1B embodiment, modified in relation to FIGS. 2 and 3, of the fishing reel in the assembled state.

DETAILED DESCRIPTION OF PREFERRED EMBODIMENTS

Figure 1A:
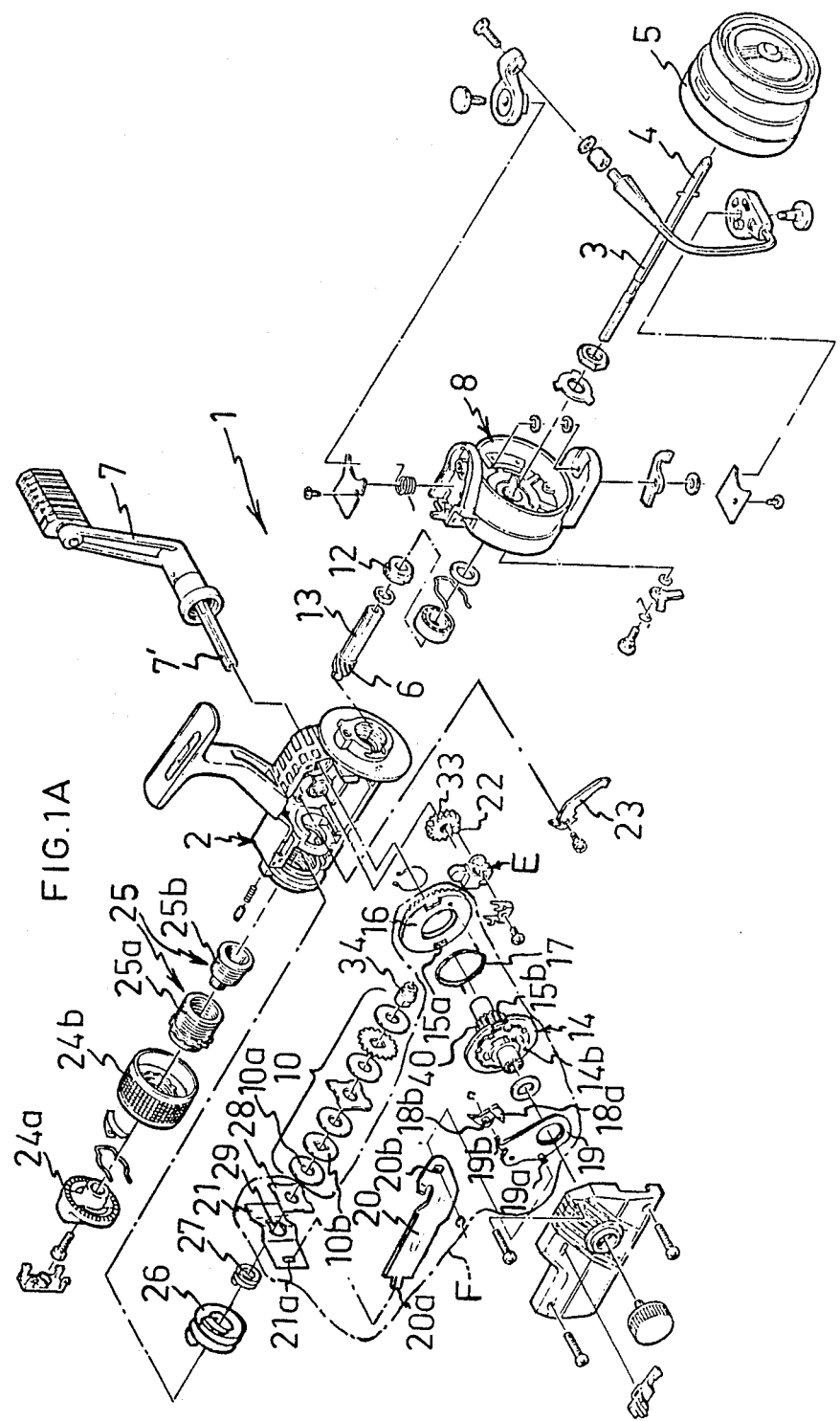
FIGS. 1A and 1B are perspective, exploded views showing different embodiments of a fishing reel according to the invention.
Figure 1B:
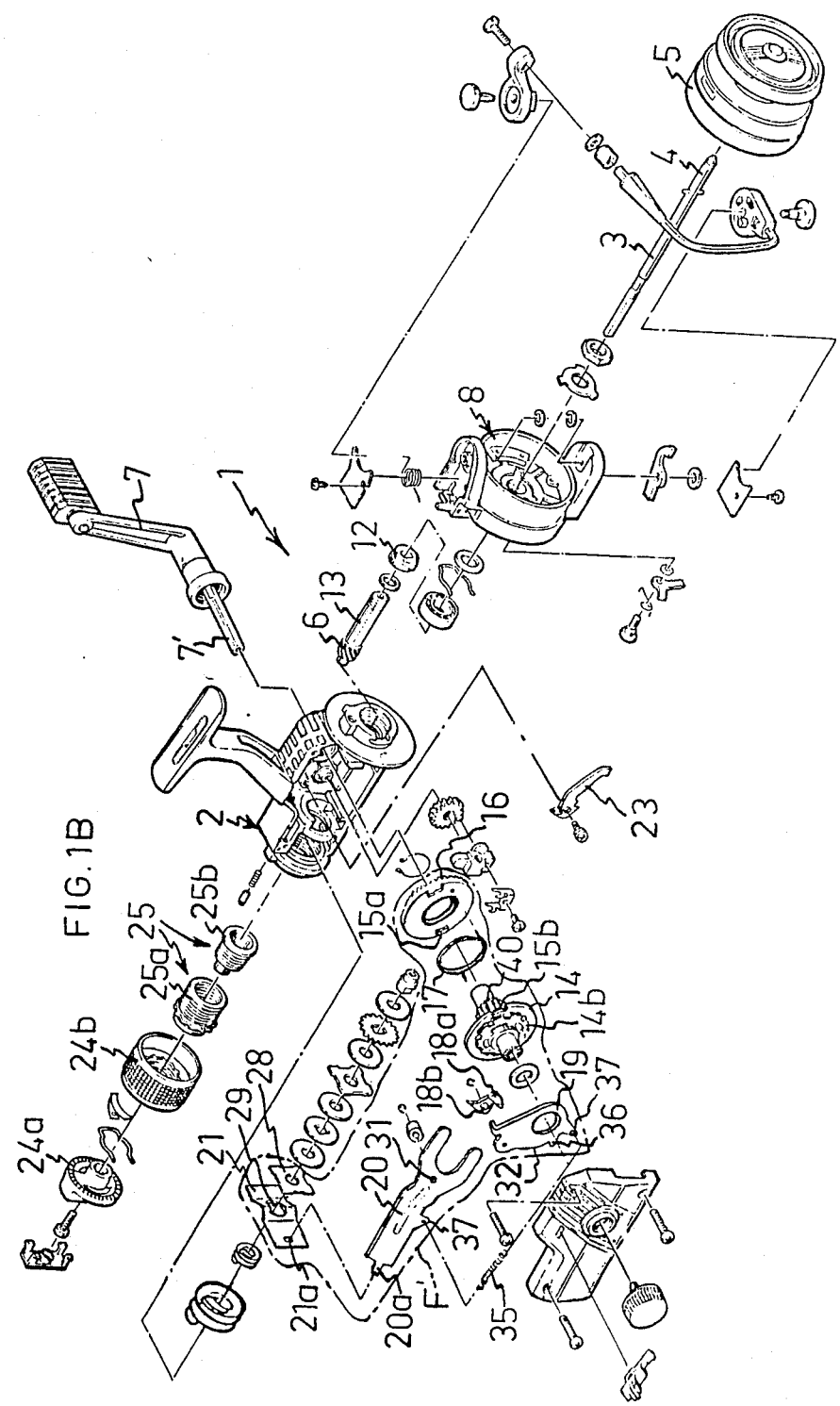

The fishing reel 1 shown in FIGS. 1A and 1B has a frame 2 and a spool shaft 3 rotatably mounted therein. A line spool 5 is non-rotatably mounted on the end portion 4 of the spool shaft 3 projecting from the front portion of the frame 2. The frame 2 also accommodates transmission means 6 for changing the rotary movement of a handle 7, both into a rotary movement of a rotor 8 for winding up the fishing line on the line spool 5 via a pinion shaft 13, and into a rotary movement of a gear wheel 33 and a pin 22 mounted thereon, via a gear wheel 40. The pin 22 engages eccentric means E fixedly connected to the spool shaft. The eccentric means E converts the rotary movement of the pin into a reciprocating movement of the spool shaft in the longitudinal direction thereof and, thus, of the spool 5. In the rear part of the frame 2, there is provided a friction brake 10 which can be set by adjusting means 24 and is intended to allow the line spool 5 to rotate under frictional drag in relation to the frame 2 to avoid excessive load on the line and possibly line break.

To allow pay-out of the line by rotation of the line spool 5, there is provided a rotor anti-reverse 23, 12 in the frame 2. The anti-reverse, by the engagement of a lever 23 with a coupling member 12 non-rotatably mounted on the pinion shaft 13, prevents rotation of the rotor 8 by means of the handle 7 in a direction contrary to the wind-up or retrieve direction. The member 12 has on its outer periphery one or more projections or cams cooperating with the lever 23 to ensure the desired function.

Since the arrangement described above is per se known, it will not be discussed in more depth here. Components in the Figures, especially FIGS. 1A and B, lacking reference numerals and not discussed in more detail above belong to this known arrangement.

Figure 2:
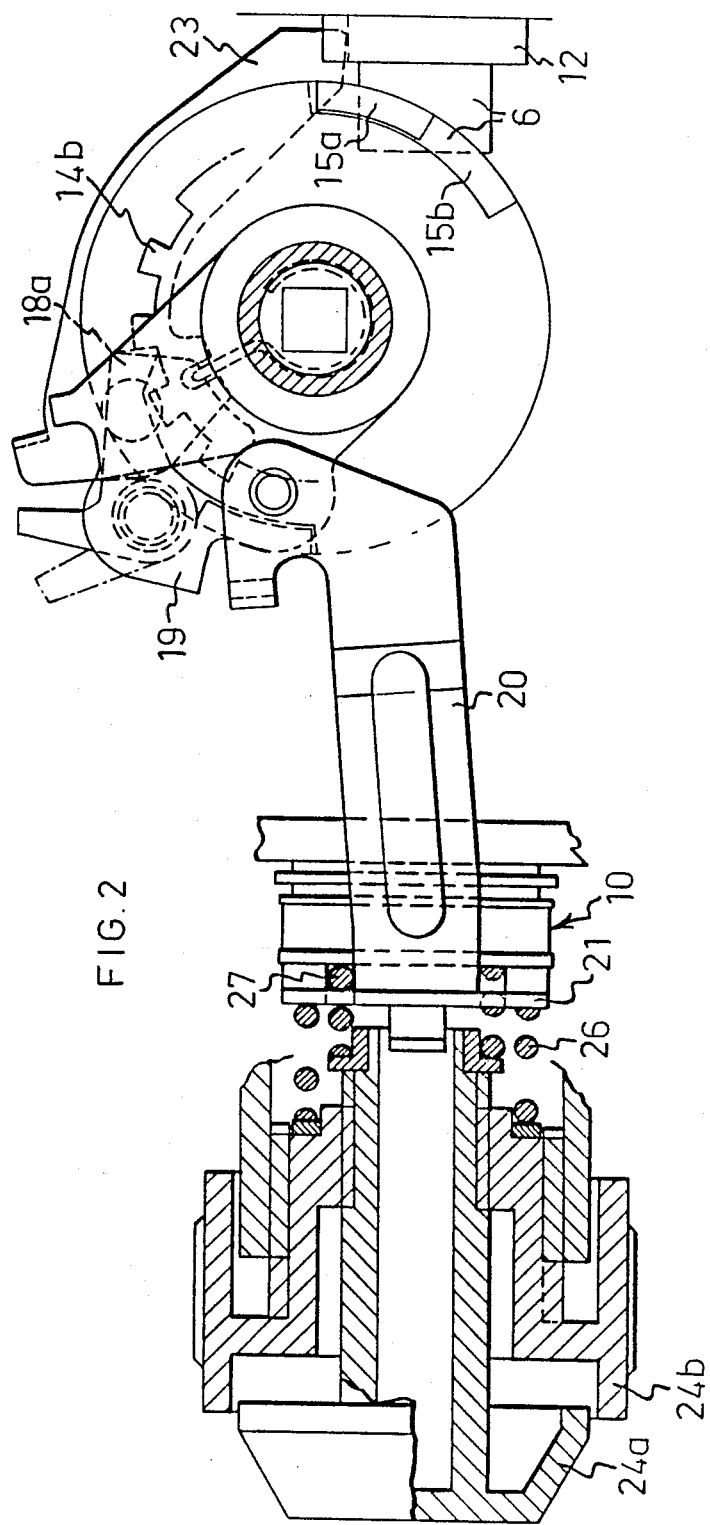
FIGS. 2 and 3 are part-sectional side and top plan views, respectively, showing parts (primarily components F in FIG. 1A) of the FIG. 1A embodiment of the fishing reel in the assembled state, certain components being removed for greater clarity of the drawing.
Figure 3:
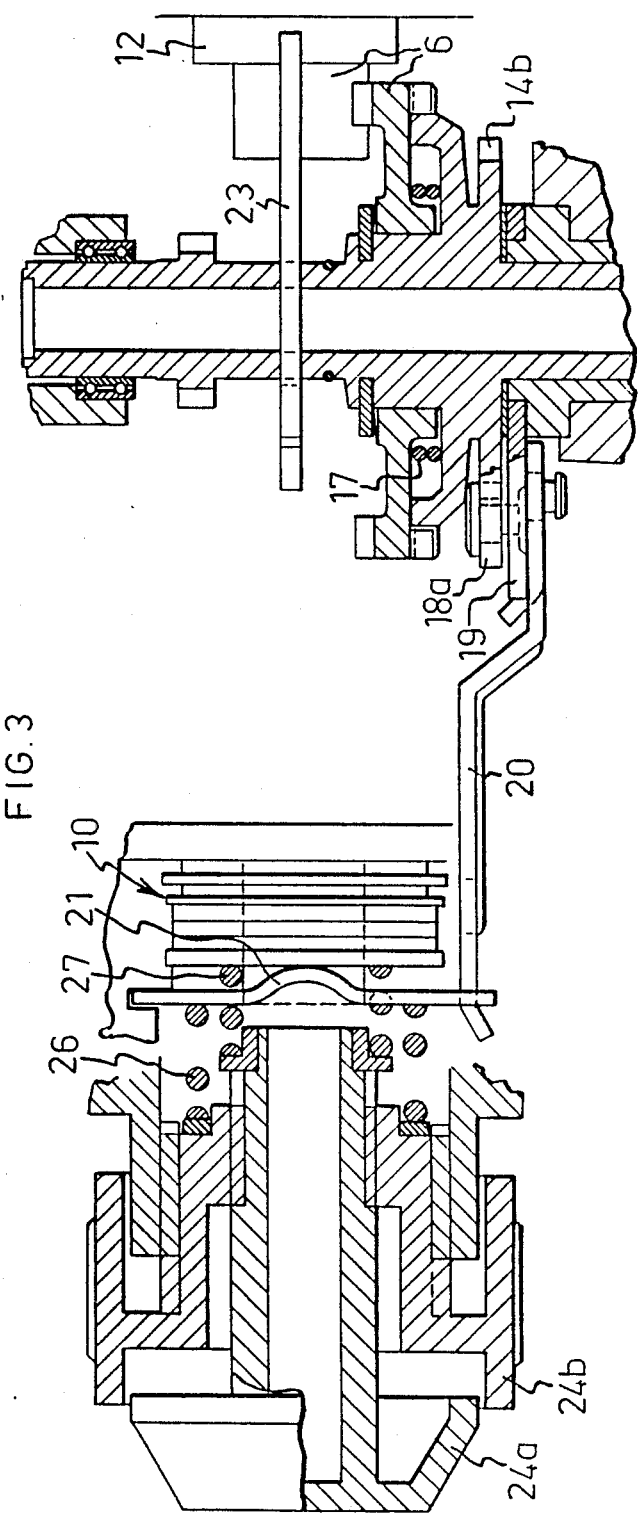

A driver wheel 14 is mounted on the shaft 7' of the handle 7 and is here formed integrally with the gear wheel 40. The transmission means 6 further comprises a crown wheel 16 which is mounted for rotation on the crank shaft 7' and which, by recesses 15a provided therein and by lugs 15b provided on the driver wheel 14, is connected to the crank shaft 7'. The dimension of the recesses 15a in the circumferential direction of the wheel 16 provides a certain play for the driver lugs 15b on the wheel 14. A helical spring 17 biases the lugs 15b of the driver wheel 14 into engagement against one lateral boundary wall of the recesses 15a, i.e. the foremost boundary wall (FIG. 2) in the direction of retrieve (arrow in FIGS. 1A and B) is foremost. In other words, the crown wheel 16 is actuated as soon as the angler operates the handle in the line wind-up direction.

Further, the reel has a mechanism 18, 19 for converting a partial rotary movement of the crank shaft 7' and, thus, of the driver wheel 14, into a translational motion of a brake release arm 20 extending in the longitudinal direction of the frame, in this direction, either forwards or backwards, whereby the arm 20 actuates a brake arm 21 in the rear part of the frame. The brake arm 21, via a recess 21a provided therein and a projection 20a on the arm 20, acts as a lever on the friction brake 10 provided in the rear part of the reel, in order, proportionally to the movement of the brake release arm 20, to increase or decrease the braking force on the spool shaft 3. The mechanism 18, 19 includes a toothed wheel 14b which is fixedly connected to the driver wheel 14 and which, when the handle 7 is turned backwards (contrary to the direction of retrieve), rotates a coupling member 19. The coupling member 19 is mounted for rotation about the shaft of the handle 7 and, when the transmission means 6 is locked (the rotor 8 locked by the rotor anti-reverse 23, 12), moves the brake release arm 20 backwards towards the rear end of the reel for brake release. The arm 20, by means of a hole 20b provided therein, is hingedly connected to a pin 19a on the coupling member 19. The backward movement of the brake release arm 20 is effected in that a pawl 18a, rotatably mounted on the coupling member 19 by means of a hole 18b and a pin 19b, engages one of the teeth of the toothed wheel 14b on the driver wheel 14 when the handle is turned backwards, and by rotating said coupling member through a certain angle, thus "shifts" the fixing point 19a of the brake release arm 20 in the longitudinal direction of the reel. The forward movement of the arm 20 is effected positively by the action of brake spring 26 which will be described in more detail hereinafter.

The brake arm 21 performs its function coaxially with the spool shaft, by affecting the frictional force transmitted to the spool shaft by friction washers 10a, 10b having round holes alternating with square holes which, via an intermediate piece 34 serving as abutment, cooperate with flats on the spool shaft. The friction brake 10 is operable in two steps by two different adjusting means 24a, 24b, each acting on a member 25 screwed into the reel frame and consisting of two parts 25a, 25b screwable in each other by the adjusting means 24a, b, such that the member 25 can be lengthened or shortened. The parts 25a, b in turn each form a support for a spring 26, 27. The spring 26 acts on the brake arm 21, and the spring 27, arranged coaxial with and inside the larger spring 26, acts directly on a thrust washer 28 included in the brake, without being capable of acting on or being acted on by the brake arm 21. This is achieved by the brake arm 21 having a hole 29 allowing passage of the spring 27. This thus means that the angler cannot completely suspend the braking effect on the spool by said backward rotation of the handle. The spool is in fact still subjected to the braking force preset by the adjusting means 24a. The adjusting means 24a and 24b engage each other in such a manner that rotation of the adjusting means 24a will automatically entail co-rotation of the adjusting means 24b.

The brake release means F operates in the following manner. When a fish of excessive size with respect to the brake force value set by the adjusting means 24a, 24b has been hooked, the handle 7 is turned backwards against the action of the spring 17. The driver wheel 14 is then also rotated until the lug 15b comes into engagement with the other, opposite boundary wall of the recess 15a of the wheel 16. Meanwhile, the pawl 18a has engaged the toothed wheel 14b and, at the same time as the wheel 14 is rotated backwards, has rotated the coupling member 19 backwards through part of a revolution. Since the brake release arm 20 is in turn fixed to the coupling member 19, said partial backward rotation of the coupling member 19 is converted into a translational motion to the left (backwards) in FIG. 1 of the brake release arm 20, directed in the spool shaft direction. This motion is transmitted to the brake arm 21 in turn urging the spring 26 away while the spring 27 is still loading the friction washers, and thus, produces a braking effect on the spool shaft 3 at the brake force value preset by the adjusting means 24a.

Figure 4:
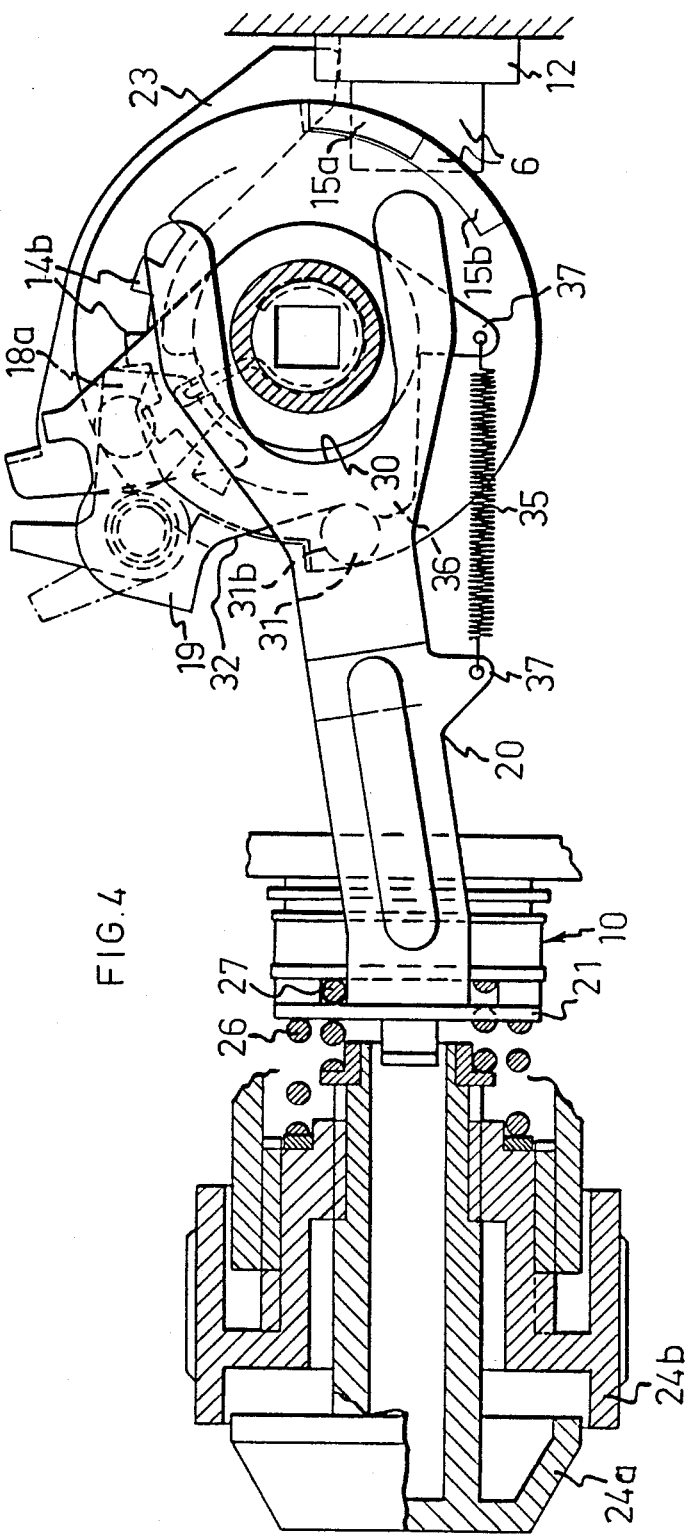

FIGS. 4 and 5 and the part F' in FIG. 1B, show an alternative embodiment of the engagement and disengagement means. The difference in relation to the embodiment described above resides only in the manner in which the arm 20 is actuated for moving backwards. At its front end, the arm 20 has a fork 30 embracing the crank shaft 7'. The coupling member 19 has a cam surface 32 which when the pawl 18a is operated by the backward rotation of the handle, acts on a roller or sleeve 31b mounted on a pin 31 on the arm 20, such that the arm 20 is moved backwards in the reel frame. At the end of the cam surface 32, there is a stop lug 36 for limiting the action of the arm 20. To facilitate the return of the arm 20 to the wind-up or retrieve position, i.e. where there is full braking effect, there is provided a return spring 35 between attachments 37 on the arm 20 and the coupling member 19.

It is evident that the reduction of the braking effect obtained by means of the brake arm 21 via the brake release arm 20 may of course vary. However, a maximal reduction of about 50% of the preset basic brake force value is preferred.

What we claim and desire to secure by Letters Patent is:

1. Fishing reel of the fixed-spool type comprising
   (a) a frame;
   (b) a spool shaft rotatably mounted in said frame and having an end portion projecting from said frame;
   (c) a line spool non-rotatably mounted on said projecting end portion of said spool shaft;
   (d) a rotor for winding up a line on said line spool;
   (e) eccentric means for axial oscillation of said spool shaft;
   (f) a handle;
   (g) transmission means operably connected between said handle and said rotor, and between said handle and said eccentric means for converting the movement of said handle in one direction, both into a rotary movement of said rotor in one direction and into a movement of said eccentric means for said axial oscillation of said spool shaft,
   (h) a rotor anti-reverse for locking against rotation of said rotor when said handle is turned in an opposite direction, and against oscillation of said spool shaft;
   (i) friction brake means with adjustable braking effect for acting on the spool shaft and braking the rotary movement of the line spool by a first preset brake force value;
   (j) adjusting means for setting said first brake force value;

(k) brake release means which is connected in said brake means and which, when operated, acts on said brake means for braking the rotation of the line spool by a predetermined second brake force value below said first brake force value; and (l) manual operating means for activating said brake release means;

(m) said operating means comprising said handle.

2. Fishing reel as claimed in claim 1, wherein said brake release means is activated by moving said handle in said opposite direction by means for causing said manual operating means to activate said brake release means in response to movement of said handle.

3. Fishing reel as claimed in claim 1, wherein said friction brake means comprises:

($i_1$) a set of washers longitudinally movable on the spool shaft coaxial therewith, a number of said washers being non-rotatably mounted, alternating with a number of rotatably mounted washers;

($i_2$) resilient means for biasing said washers into surface contact with each other, said resilient means engaging said adjusting means, and said brake release means comprising:

($k_1$) a first toothed wheel non-rotatably mounted on the shaft of said handle;

($k_2$) a second toothed wheel rotatably mounted on the shaft of said handle;

($k_3$) engagement means on said first and second toothed wheels, said engagement means allowing engagement between said first and said second wheels and allowing relative rotary movement of said first and second wheels about the axis of said spool shaft between first and second relative positions of rotation;

($k_4$) biasing means for biasing said first and second wheels into said first relative position of rotation;

($k_5$) pawl means for lockingly engaging with the teeth of said second toothed wheel when said handle is operated for movement in said opposite direction against the action of said biasing means, from said first to said second position of rotation;

($k_6$) lever means connected to said pawl means and engaging said resilient means and arranged, when said second toothed wheel is rotated from said first to said second position of rotation, to act on said resilient means for reducing the load thereof on said washers;

said lever means being arranged, when said first toothed wheel is rotated to said second position of rotation, to act on said resilient means so as to brake the rotation of said line spool by said predetermined second brake force value.

4. Fishing reel as claimed in claim 3, wherein said brake release means further comprises:

($k_7$) an arm engaging said pawl means; and ($k_8$) a lever engaging said arm and biased by said resilient means.

5. Fishing reel as claimed in claim 4, wherein said resilient means comprise two helical compression springs, one of which is slidably inserted in the central opening of the other.

6. Fishing reel as claimed in claim 5, wherein said lever has a hole allowing passage of only one of said compression springs to provide said second predetermined lower brake force value.

7. Fishing reel as claimed in claim 6, wherein said adjusting means comprise two adjusting members, each acting on one of said compression springs.

* * * * *